UNITED STATES PATENT OFFICE.

OTTO SCHMIDT, OF MANNHEIM, GEORG LUTZ, OF LUDWIGSHAFEN-ON-THE-RHINE, AND THEODOR EICHLER, OF MANNHEIM, GERMANY, ASSIGNORS TO BADISCHE ANILIN & SODA FABRIK, OF LUDWIGSHAFEN-ON-THE-RHINE, GERMANY, A CORPORATION.

CELLULOSE-ESTER SOLUTION.

1,045,895.    Specification of Letters Patent.    Patented Dec. 3, 1912.

No Drawing.    Application filed June 13, 1912. Serial No. 703,509.

*To all whom it may concern:*

Be it known that we, OTTO SCHMIDT, GEORG LUTZ, and THEODOR EICHLER, subjects, respectively, of the King of Prussia, the German Emperor, and the Grand Duke of Baden, residing, respectively, the first and third at Mannheim, the second at Ludwigshafen-on-the-Rhine, Germany, have invented new and useful Improvements in Cellulose-Ester Solutions, of which the following is a specification.

For producing solutions of cellulose esters, for instance, nitrocellulose and celluloid, amyl acetate has hitherto been employed as the solvent, either alone or in admixture with other liquids. We have found that for the purpose of producing solutions of nitrocellulose, either as such or in combination or admixture with other compounds, esters of completely hydrogenized cyclic alcohols containing from five to six carbon atoms in the ring, such for instance as cyclo-hexanol formiate, cyclo-hexanol acetate, methyl-cyclo-hexanol formiate, and the esters of cyclo-pentanol, such for instance as beta-methyl-cyclo-pentanol acetate, can be employed with great advantage, particularly on account of their small inflammability, the degree to which they dissolve the nitrocellulose, the mobility of the solutions obtained, and the rapidity with which the solvent evaporates, and the fact that the nitrocellulose is left behind in the form of a very elastic resistive cover which scarcely alters the appearance of the surface of the body which is treated with the solution. The said esters are preferable to amyl-acetate and the like, as these latter give rise to vapors which are unpleasant and have deleterious physiological effects.

The following examples will serve to illustrate further the nature of this invention and how it can be carried into practical effect, but our invention is not confined to these examples. The parts are by weight.

Example 1: Dissolve 2 parts of nitrocellulose in 100 parts of cyclo-hexanol acetate. The solution can be immediately used for lacquering purposes.

Example 2: Dissolve 1 part of nitrocellulose and 1 part of camphor in 60 parts of cyclohexanol acetate. The solution can be employed in a manner similar to zapon lacquer.

Example 3: Dissolve 2 parts of nitrocellulose in about 100 parts of beta-methyl-cyclopentanol acetate, whereupon a solution is obtained which, without further treatment, can be employed for lacquering purposes.

In the above examples, instead of cyclohexanol acetate or beta-methyl-cyclopentanol acetate, esters obtainable from others of the lower fatty acids with hexahydrophenols or cyclopentanols can be used. If desired, other solvents can be employed in addition, such for instance as alcohol, and other additions, such for instance as camphor or castor oil, can be made which are of general applicability in the production of such solutions.

Now what we claim is:—

1. A new composition of matter containing nitrocellulose and an ester of a completely hydrogenized cyclic alcohol containing from five to six carbon atoms in the ring.

2. A new composition of matter containing nitrocellulose and cyclohexanol acetate.

3. A new composition of matter containing nitrocellulose, camphor and cyclohexanol acetate.

4. A new composition of matter containing one part of nitrocellulose, one part of camphor and sixty parts of cyclohexanol acetate.

In testimony whereof we have hereunto set our hands in the presence of two subscribing witnesses.

OTTO SCHMIDT.
GEORG LUTZ.
THEODOR EICHLER.

Witnesses:
J. ALEC. LLOYD,
JOSEPH PFEIFFER.